(12) United States Patent  
Walsh (10) Patent No.: US 8,715,452 B2  
(45) Date of Patent: May 6, 2014

(54) SEAMLESS PROTECTIVE APPAREL (75) Inventor: Megan Walsh, Chicago, IL (US)

(73) Assignee: Medline Industries, Inc., Mundelein, IL (US)

( * ) Notice: Subject to any disclaimer, the term of this patent is extended or adjusted under 35 U.S.C. 154(b) by 0 days.

(21) Appl. No.: 13/565,252

(22) Filed: Aug. 2, 2012

(65) Prior Publication Data

US 2013/0036527 A1     Feb. 14, 2013

Related U.S. Application Data

(60) Provisional application No. 61/521,646, filed on Aug. 9, 2011.

(51) Int. Cl.
| | |
|---|---|
| *B32B 33/00* | (2006.01) |
| *B29C 65/00* | (2006.01) |
| *B32B 37/00* | (2006.01) |
| *C09J 5/10* | (2006.01) |
| *A41D 1/00* | (2006.01) |
| *A41D 3/02* | (2006.01) |

(52) U.S. Cl.
USPC ............. 156/293; 156/90; 156/294; 156/296; 156/308.2; 2/93

(58) Field of Classification Search
USPC ............... 2/59, 69, 125, 457, 48, 49.4, 243.1, 2/114, 105, 455, 456, 16, 46, 85, 93, 97, 2/159, 161.6, 161.7, 164, 167; 156/60, 156/90, 91, 92, 93, 148, 149, 242, 244.11, 156/244.12, 244.13, 293, 294, 296, 303.1, 156/308.2, 309.6
See application file for complete search history.

(56) References Cited

U.S. PATENT DOCUMENTS

| | | | |
|---|---|---|---|
| 5,244,716 | A | 9/1993 | Thornton et al. |
| 5,335,372 | A | 8/1994 | Wiedner et al. |
| 5,444,871 | A | 8/1995 | Lopez |
| 2001/0053643 | A1 | 12/2001 | McAmish et al. |

OTHER PUBLICATIONS

Yu, Cheul J., "PCT Search Report", PCT Application No. PCT/US2012/049766; Filed Aug. 6, 2012; Mailed Apr. 1, 2013.

*Primary Examiner* — Philip Tucker
*Assistant Examiner* — Brian R Slawski
(74) *Attorney, Agent, or Firm* — David Noskowicz; Phillip H. Burrus, IV (57) ABSTRACT

A sleeve for a protective garment, such as a medical gown, includes a knit, woven, or non-woven layer and a seamless layer that are laminated together. The knit, woven, or non-woven layer can be a circularly knit seamless layer, or alternatively can have seams. The seamless layer can be water or vapor impermeable or resistant so as to prevent microorganisms, pathogens, liquids, or other substances from passing through the sleeve.

11 Claims, 6 Drawing Sheets

SEAMLESS PROTECTIVE APPAREL

CROSS REFERENCE TO PRIOR APPLICATIONS

This application claims priority and benefit under 35 U.S.C. §119(e) from U.S. Provisional Application No. 61/521,646, filed Aug. 9, 2011, which is incorporated by reference for all purposes.

BACKGROUND

1. Technical Field

This invention relates generally to protective apparel, and more particularly to protective apparel components suitable for use with medical gowns.

2. Background Art

Medical professionals frequently interact with patients who have communicable diseases. When treating such patients, the medical professional must take care not become infected or ill due to the microorganisms or pathogens related to the disease. This is frequently accomplished by donning a medical gown. These medical gowns are sometimes referred to as an "isolation gown."

One problem associated with prior art medical gowns involves their construction. When multiple parts of the gown are sewn together, the resulting seam can act as a pathway for pathogens and other infections substances to pass through the medical gown. Such pathways put the medical services provider at risk of becoming ill. It would be advantageous to have a gown that overcomes some of the issues associated with prior art medical gowns.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide sleeves for a medical gown or other protective apparel that have no seams. The elimination of seams along the sleeves serves to protect a medical professional from coming into contact with pathogens and microorganisms carrying communicable diseases. As medical professionals generally interact with patients with their hands and arms, rather than other parts of their bodies, the inclusion of seamless sleeves in a medical gown eliminates a large majority of pathways between the patient and medical professional. This is true even when the seamless sleeves are sewn or otherwise joined to a body covering portion of a medical gown with seams, or where the body covering portion has seams.

In one or more embodiments, a textile material or fabric is constructed in a tubular form. Examples of explanatory constructions include weaving and knitting. For example, a circular knit fabric can be formed into the outer portion of a sleeve. A complementary circular knit fabric can be formed into an inner portion of a sleeve. An interior layer can then be extruded in a tubular fashion. The material for the interior layer can vary based upon application. Embodiments of the invention contemplate at least eight different types of materials that may be used for the interior layer: water resistant materials, water impermeable materials, chemical resistant materials, chemical impermeable materials, viral or bacterial resistant materials, viral or bacterial impermeable materials, vapor impermeable materials, and vapor permeable materials. For example, the interior layer may be vapor impermeable in some embodiments. Alternatively, it may be vapor permeable in other embodiments. It may be water resistant in still other embodiments, and water impermeable in other embodiments. Each embodiment can be extruded in a tubular configuration. To provide viral or bacterial impermeable properties, the interior layer can be coated or impregnated with antimicrobial or antiviral agents as well. Regardless of material used, the three components can then be laminated together to form a tubular, seamless construction. Seamless sleeves configured in accordance with one or more embodiments of the invention can be configured with multiple layers of textile material or barrier material as required by a particular standard or application.

Figure 1:
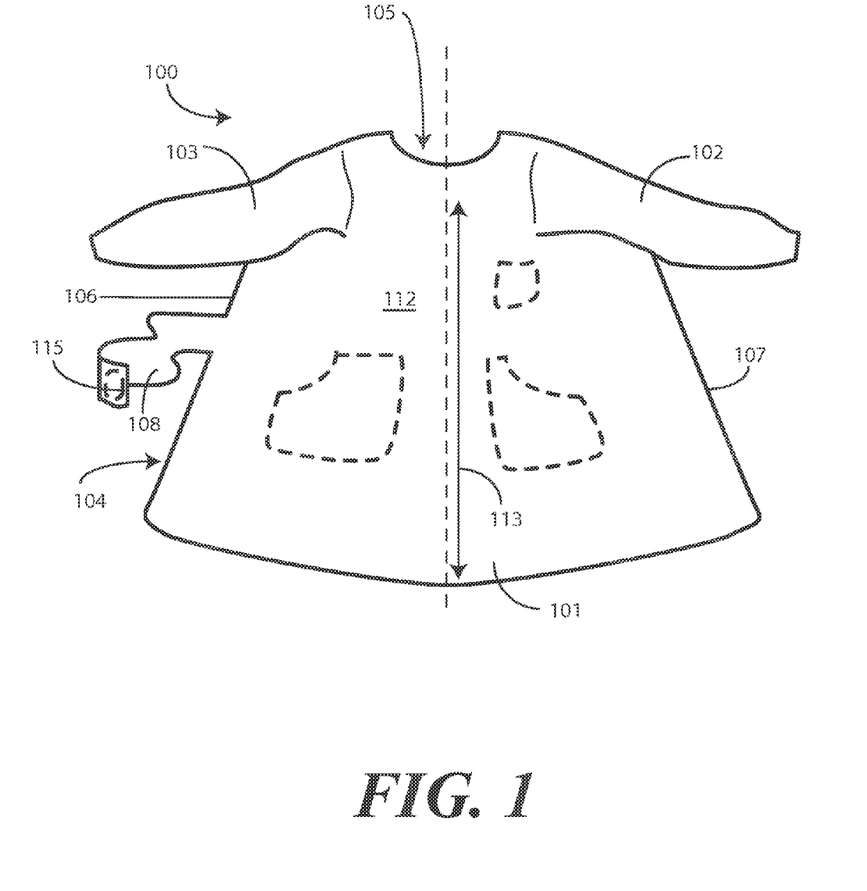
FIG. 1 illustrates a front elevation view of a protective garment configured in accordance with one or more embodiments of the invention.

Turning now to FIG. 1, illustrated therein is a protective garment 100 configured in accordance with one or more embodiments of the invention. For ease of illustration, the illustrative protective garment 100 shown throughout the views is configured as a medical gown. However, it will be clear to those of ordinary skill in the art having the benefit of this disclosure that the protective garment 100 could be configured in accordance with the needs of other professions, applications, and requirements. A medical gown is merely one explanatory embodiment.

A body covering portion 101 is configured to wrap about the torso of a wearer. In one embodiment, the body covering portion 101 is manufactured from a non-woven fabric. In another embodiment, the body covering portion 101 is manufactured from a woven fabric. In yet another embodiment, the body covering portion 101 is manufactured from a knitted fabric. The body covering portion 101 can optionally include and water resistant lining that prevents the passage of fluids through the body covering portion 101. Where a non-woven fabric is used, the non-woven fabric can be a disposable material. Alternatively, where a woven, non-woven, or knitted fabric is used, body covering portion 101 can be configured for laundering and reuse.

Using non-woven fabrics as an example, the body covering portion 101 can be manufactured from spunbond-meltblown-spunbond material. Other materials can be used for the body covering portion 101, including, for example, various woven, non-woven, hydroentangled materials, and/or combinations thereof, absorbent Airlaid, spunlace, blends of polyester, polypropylene, polyethylene, urethane, and/or combinations thereof, using various methods, including a spunbond metblown spundbond (SMS) method, a spunbond metblown metblown spundbond method (SMMS), and a spunbond metblown metblown spundbond method (SMMMS). Suppliers of such materials include Cardinal Health in Dublin, Ohio, Kimberly Clark in Neena, Wis., Molnycke Health Care in Newtown, Pa., and Precept Medical Products, Inc., in Arden, N.C. These materials and methods are illustrative only, as others will be readily apparent to those of ordinary skill in the art having the benefit of this disclosure. For example, one or more antimicrobial layers can be added to further enhance antimicrobial protection. Additionally, the material can optionally include a water resistant lining that prevents the passage of fluids through the material. In one embodiment, the length 113 of the body covering portion 101 is configured to run from at least a wearer's shoulder to below their knee.

A first sleeve 102 and a second sleeve 103 extend distally from the body covering portion 101. The first sleeve 102 and the second sleeve 103 are configured to receive wearer's arms when the protective garment 100 is donned. As will be described below with reference to FIGS. 3-6, one or both of the first sleeve 102 and the second sleeve 103 comprise a knit layer having a inner side and an outer side and a seamless barrier layer coupled to one of the inner side or the outer side of the knit layer.

As shown in FIG. 1, protective garment 100 may optionally include pockets 117 or other surface features. A front portion 112 of the body covering portion 101 is configured to be placed against the front of the torso of a wearer. The body covering portion 101 then wraps around and terminates at a body opening 104 that is bounded by a first side 106 and a second side 107.

In the illustrative embodiment of FIG. 1, the body opening 104 is configured as a slit that runs the length 113 of the body covering portion 101, up the back of the protective garment 100, terminating at a neck opening 105. It will be clear to those of ordinary skill in the art having the benefit of this disclosure that the explanatory configuration of FIG. 1 is illustrative only. For example, the protective garment 100 could be configured as a poncho in which it is pulled over the wearer's head as well. In this illustrative embodiment, the first side 106 and second side 107 of the body opening 104 are configured to permit the wearer to don the protective garment 100 by wrapping the first side 106 and second side 107 about the wearer's torso.

In one embodiment, one of the first side 106 or the second side 107 includes a coupling tab 108 that extends therefrom. The coupling tab 108 is configured to wrap about the wearer and span the body opening 104. In one embodiment, the coupling tab 108 includes an adhesive 115 that is configured to attach to the non-woven material on the other side of the body opening. Where a coupling tab 108 is included, once the wearer dons the garment, the coupling tab 108 can be wrapped about the torso, such as about the wearer's waist, and adhesively affixed to the other side.

Figure 2:
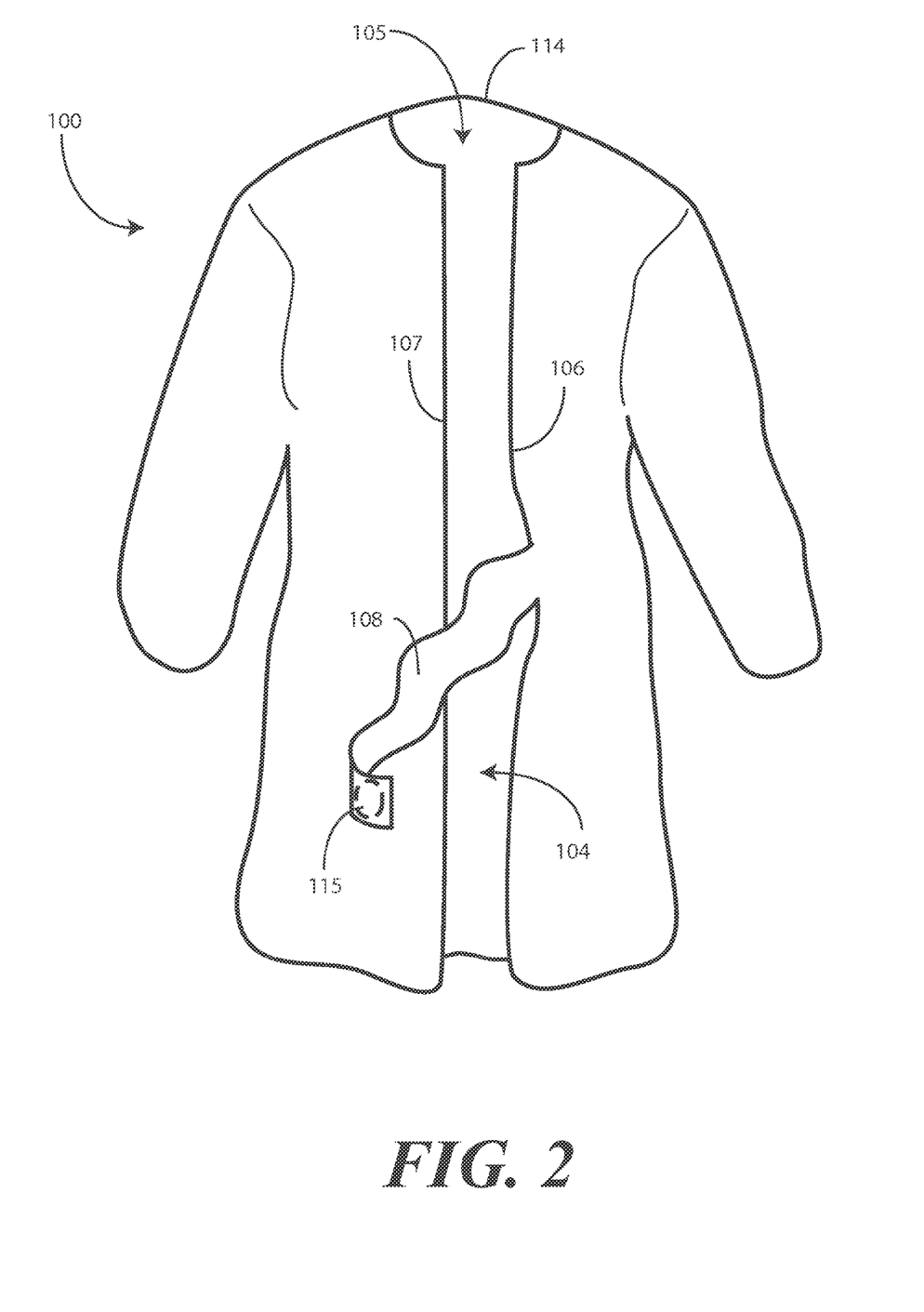
FIG. 2 illustrates a rear elevation view of a protective garment configured in accordance with one or more embodiments of the invention.

Turning now to FIG. 2, illustrated therein is a rear view of a protective garment 100 configured in accordance with embodiments of the invention. From this view, the body opening 104 and neck opening 105 can more readily be seen. Additionally, the coupling tab 108 and adhesive 115 may be seen extending from the first side 106 of the body opening.

As shown in FIG. 2, one coupling tab 108 is disposed approximately waist-high so as to span the body opening 104 to the second side 107 about the waist of the wearer. It will be clear to those of ordinary skill in the art having the benefit of this disclosure, however, other configurations are possible. For example, multiple coupling tabs could be employed. Additionally, the coupling tabs may be disposed at other locations along the body opening 104, such as shoulder-high or mid-back.

Figure 3:
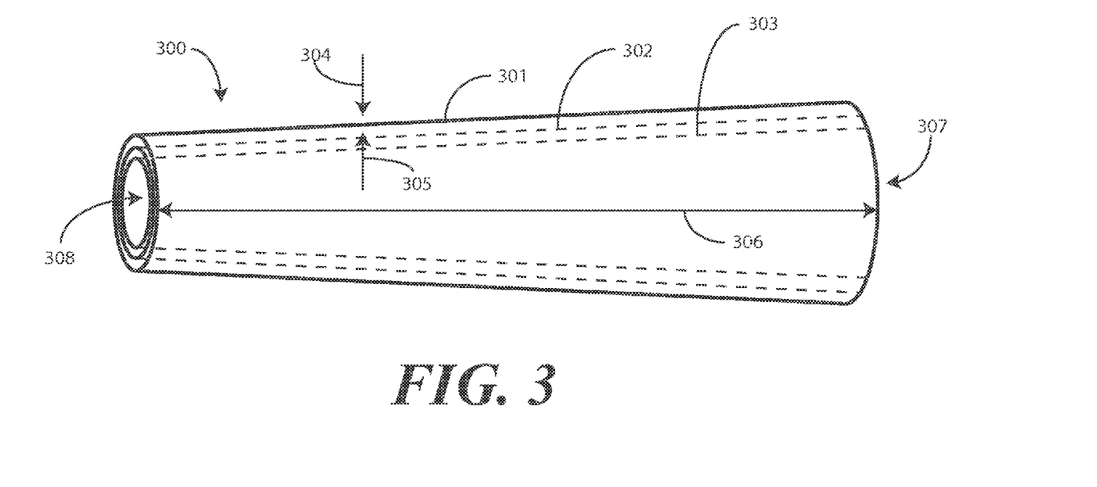
FIG. 3 illustrates side elevation view of one embodiment of a seamless sleeve configured in accordance with one or more embodiments of the invention.
Figure 4:
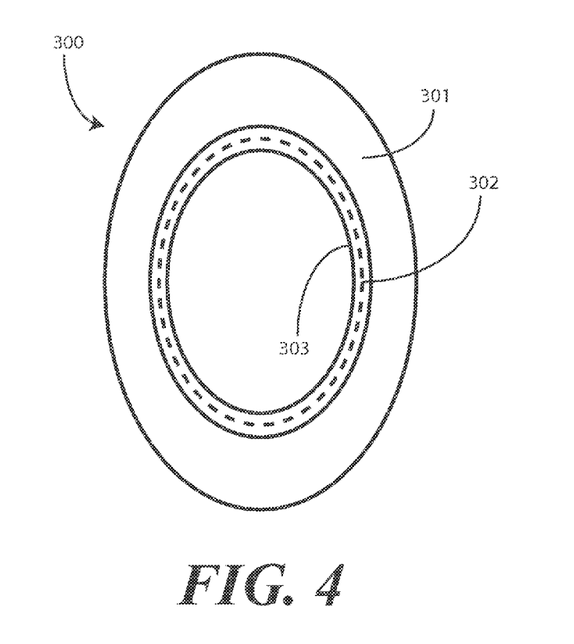
FIG. 4 illustrates a front elevation view of one embodiment of a seamless sleeve configured in accordance with embodiments of the invention.
Figure 5:
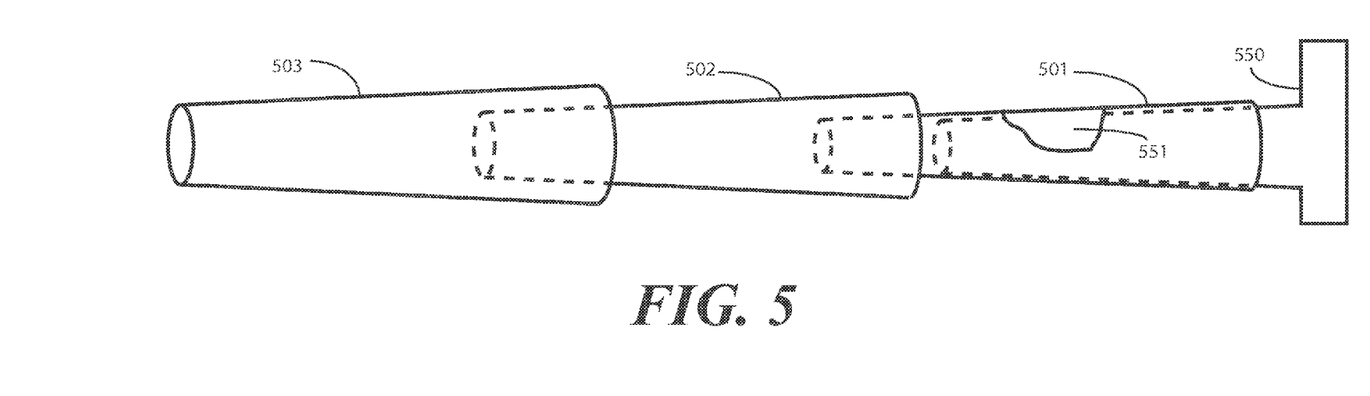
FIG. 5 illustrates one method for coupling a barrier layer with textile material to form a seamless sleeve configured in accordance with one or more embodiments of the invention.

Turning now to FIGS. 3 and 4, illustrated therein is one embodiment of a multilayer, seamless garment portion 300, which in this embodiment is a sleeve configured for attachment to the body covering portion (101) of a protective garment (100) in accordance with embodiments of the invention. In this illustrative embodiment, the sleeve comprises at least a first layer 301, and a seamless layer 302. The first layer 301 of this embodiment is configured as a circular knit layer having an inner side 305 and an outer side 304. The seamless layer 302 is configured as a seamless barrier layer that is one or more of eight materials: water resistant materials, water impermeable materials, chemical resistant materials, chemical impermeable materials, viral or bacterial resistant materials, viral or bacterial impermeable materials, vapor impermeable materials, and vapor permeable materials. Of course, combinations could also be used. While the second seamless layer 302 could be coupled to either the inner side 305 of the first layer 301 or the outer side 304 of the first layer 301, in this illustrative embodiment the seamless layer 302 is coupled to the inner side 305 of the first layer 301 such that the circular knit fabric forms a soft, outer layer of the sleeve. When the first layer 301 is coupled to the second seamless layer 302, a laminated tubular layer is formed. The laminated tubular layer of FIG. 1 is configured to form a tubular garment portion.

The multi-layered seamless sleeve may also have a plurality of other layers as well. For instance, in this illustrative embodiment an optional third layer 303 is coupled to the second seamless layer 302. The third layer 303 is coupled to the seamless barrier layer on a side opposite the outer circular knit fabric layer with the seamless barrier layer being disposed between the circular knit layer and the third layer 303. Thus, when the third layer 303 is a circular knit layer, it forms a soft, interior of the sleeve or tubular garment portion. Additional barrier layers or textile layers can be added as applications warrant. In this embodiment, the three layers are laminated together to form a unitary sleeve. The sleeve is coupled to other garment portions, e.g., body covering portion (101)

of FIG. 1, to form a complete garment such as a medical gown or other protective apparel. All three layers may be seamless. Alternatively, the circular knit layers may have seams with at least one of the barrier layers being seamless. In general the at least one seamless layer forms a barrier layer limiting unwanted material from passing from the outside of the barrier to the wearer of the garment. The circular knit layer(s) can provide structure to the garment where the barrier film layer is thin. The thickness of the barrier layer is a result of its function. The circular knit layer may also have wicking characteristics. Further, the circular knit layer may provide comfort to the user.

The first layer 301 may be made of material typically used in woven fabrics such as polyester, cotton, nylon or combinations thereof, or any other woven fabric material. As noted above, the material may also be non-woven or knitted. The first layer 301 can be woven together and laminated to the seamless layer 302. The seamless layer 302 may be an extruded material, such as an extruded film or coating. In one embodiment, the sleeve tapers along a length 306 extending from a first end 307 to a second end 306. The broader end of the taper can be attached to the body covering portion (101) of a protective garment (100) to form a sleeve. Elastic or other sleeve finishing elements may be coupled to the narrower end.

In one embodiment, the seamless layer 302 comprises properties that prevent unwanted substances from passing through the garment to the wearer. The seamless layer 302 can be any of eight different materials: water resistant materials, water impermeable materials, chemical resistant materials, chemical impermeable materials, viral or bacterial resistant materials, viral or bacterial impermeable materials, vapor impermeable materials, and vapor permeable materials. Of course, combinations could also be used.

In one embodiment, the seamless layer 302 can be configured to meet the PB70 Standard of the Association for the Advancement of Medical Instrumentation (AAMI). For example, the barrier layer may have a moisture vapor transmission rate (MVTR) that allows for comfort during wearing while still meeting the Spray impact test (AATCC42), Hydrostatic Pressure testing (AATCC127) and Viral Penetration testing (ASTM-F1671) guidelines. For medical applications the barrier layer has properties that prevent contaminants from passing through to the care giver. For example the barrier layer may be a polyurethane, PTFE, latex, PF latex, powdered latex, powdered vinyl, nitrile, PF vinyl, polyvinyl, or other synthetic material having vapor and moisture barrier characteristics that may be required by an applicable AAMI level. This allows the garment to perform as an infection protection measure. In one alternate embodiment, the first layer 301 has a seam. The third layer 303 may optionally have a seam as well. However, the seamless layer 302 of this embodiment is still seamless so as to meet applicable AAMI requirements.

The layers may be formed independently and then laminated together or they may be formed simultaneously, or at least substantially simultaneously and laminated together without steps in-between. In one embodiment, the first layer 301 and the seamless layer 302 are adhesively coupled together. In another embodiment, the first layer 301 and the seamless layer 302 are thermally bonded together. Other manufacturing techniques can be used as well.

In the illustrative embodiment of FIGS. 3 and 4, the first layer 301, seamless layer 302 and third layer 303 are concentrically aligned with each other. The first layer 301, seamless layer 302, and the third layer 303 are also coextensive. The sleeve of FIGS. 3 and 4 can be manufactured in a variety of ways.

Figure 8:
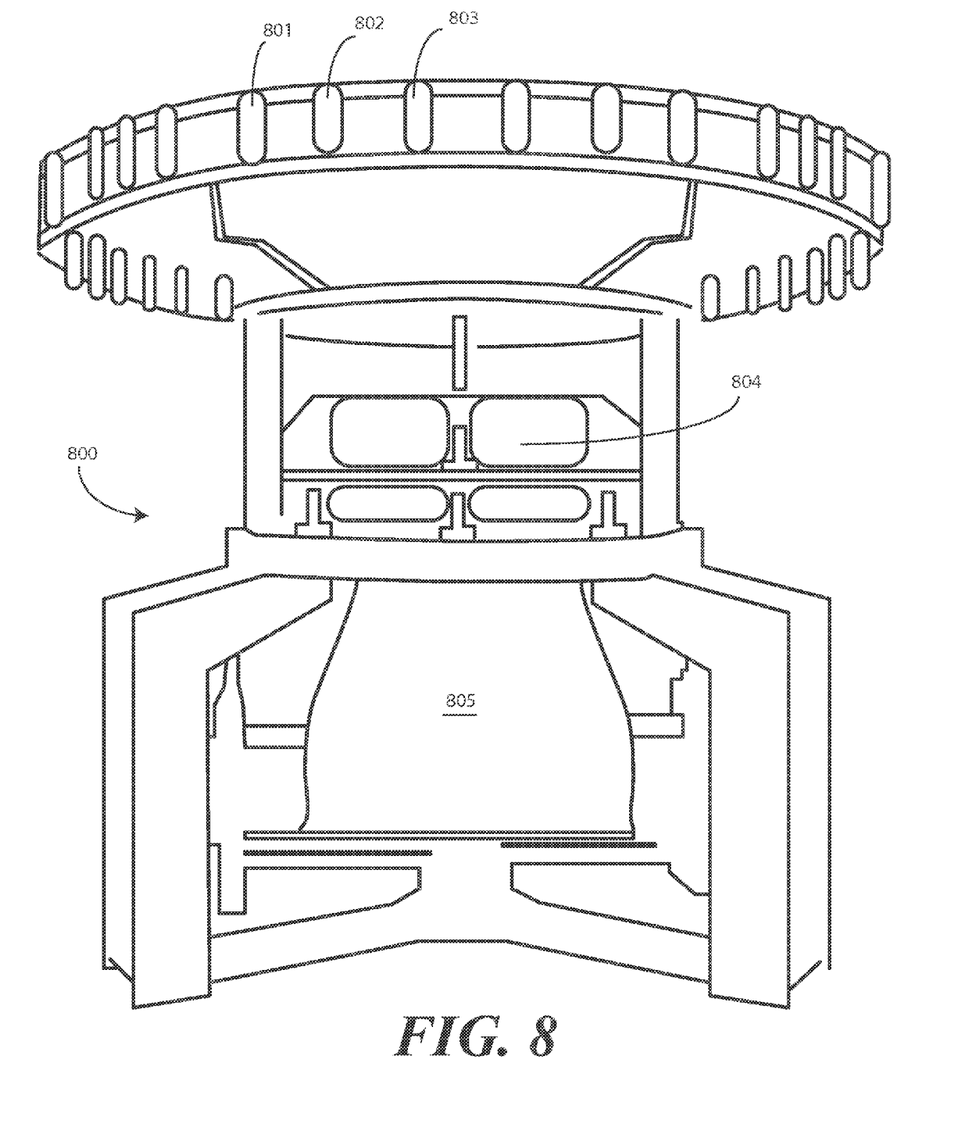
FIG. 8 illustrates one circular knitting machine suitable for use in forming elements of embodiments of the invention.

Turning briefly to FIG. 8, in one example a seamless sleeve machine 800 may include circularly disposed material spools 801,802,803, etc., that have material drawn into a circular knitting apparatus 804 to form a seamless, circularly knit layer 805. In another process, the seamless layer can be formed by an extrusion process. The layers formed by the seamless sleeve machine 800 can be formed independently and subsequently coupled to one another. In one example, illustrated in FIG. 5, a first layer 503 is place on a form 550. A layer of adhesive 551 is applied to the first layer 503. Then a second layer 502, which is the seamless layer in this explanatory embodiment, is placed over the adhesive coated first layer 503. The adhesive 551 may be active upon application to the first layer or it may be activated after the second layer 502 is applied. For example, the adhesive 551 may be thermally activated, pressure activated or chemically activated. The adhesive 551 may be a two part adhesive, wherein a first adhesive part is applied to the first layer and a second adhesive part is applied to the second layer. Having an adhesive 551 that is later capable of actuation, post application, allows for placement and alignment of the second layer 502 on the first layer without the layers sticking prior to the desire configuration. The outer layer 501 can be applied in a similar fashion.

Figure 6:
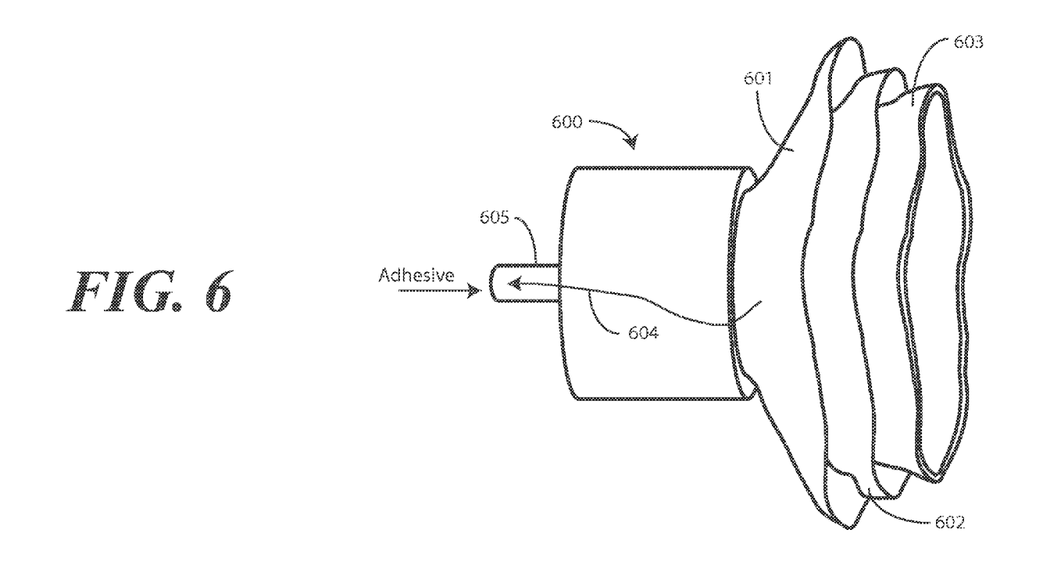
FIG. 6 illustrates one method for coupling a barrier layer with textile material to form a seamless sleeve configured in accordance with one or more embodiments of the invention.

Turning to FIG. 6, illustrated therein is another knitting apparatus 600 configured to make seamless sleeves configured in accordance with embodiments of the invention in a single step. The knitting apparatus 600 can comprise a first and second circular knitting apparatuses that are concentrically aligned, with an extruder that is configured between the two circular knitting portions of the machine. All three layers 601,602,603 could then be concentrically and simultaneously formed in a coextensive arrangement. Said another way, the circular knit layers 601,603 and the extruded barrier layer 602 are all created substantially simultaneously. Once formed, they are continuously run 604 through a laminating portion 605 of the machine to be thermally or adhesively coupled together. While this illustrates one embodiment, it will be clear to those of ordinary skill in the art having the benefit of this disclosure that other embodiments are contemplated as well. For example, the process outlined above could also be done in separate steps. Moreover, the circular knit layers 601,603 could be knitted and finished and then laminated together.

Figure 7:
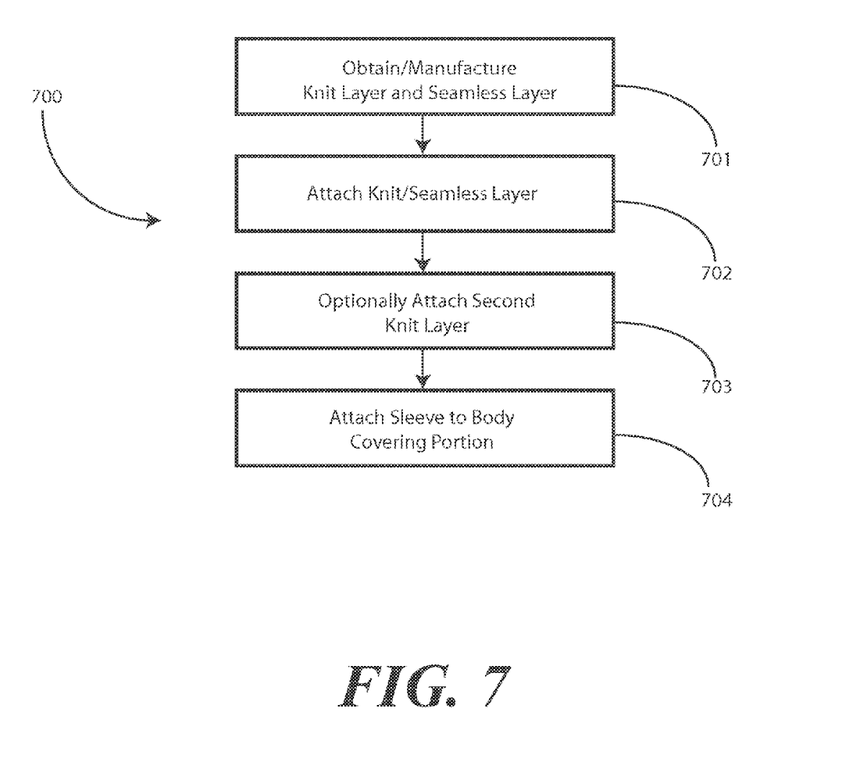
FIG. 7 illustrates one method for manufacturing a sleeve in accordance with one or more embodiments of the invention.

Turning to FIG. 7, illustrated therein is a method 700 of making a sleeve for protective apparel in accordance with one or more embodiments of the invention. At step 701, a circularly knit layer and seamless barrier layer are manufactured or formed. At step 702, the seamless barrier layer is attached to the circularly knit layer to form a sleeve. The seamless barrier layer can be attached either to an inner side or outer side of the circularly knit layer. At optional step 703, a second knit layer can be attached to the seamless barrier layer on a side opposite the side where the knit layer was attached in step 702. At step 704, the sleeve can be attached to a body covering portion to form a gown or protective apparel.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of making a sleeve of an article of protective apparel, comprising:
   attaching a seamless barrier layer to a circularly knit layer having an inner side and an outer side to form the sleeve;
   wherein the seamless barrier layer is attached to one of the inner side or the outer side of the circularly knit layer, the seamless barrier layer comprising a film.

2. The method of claim 1, further comprising attaching the sleeve to a body covering portion to form the protective apparel.

3. The method of claim 1, further comprising attaching another circular knit layer to the seamless barrier layer on a side opposite the circularly knit layer.

4. The method of claim 1, wherein the attaching comprises adhesively attaching the seamless barrier layer to the circularly knit layer.

5. The method of claim 4, the seamless barrier layer and the circularly knit layer forming a laminated tubular layer.

6. The method of claim 3, the another circular knit layer coupling to the seamless barrier layer on a side opposite the circular knit layer with the seamless barrier layer disposed between the circular knit layer and the another circular knit layer.

7. The method of claim 6, the circular knit layer, the another circular knit layer, and the seamless barrier layer coextensive.

8. The method of claim 3, further comprising attaching another seamless barrier layer coupled to one of the circular knit layer or the another circular knit layer.

9. The method of claim 1, the attaching comprises thermally coupling the seamless barrier layer to the circularly knit layer.

10. The method of claim 1, the sleeve tapering along a length extending from a first end to a second end.

11. The method of claim 1, the circular knit layer comprising non-woven material.

\* \* \* \* \*

UNITED STATES PATENT AND TRADEMARK OFFICE
CERTIFICATE OF CORRECTION

PATENT NO.         : 8,715,452 B2                                             Page 1 of 1
APPLICATION NO.    : 13/565252
DATED              : May 6, 2014
INVENTOR(S)        : Megan Walsh It is certified that error appears in the above-identified patent and that said Letters Patent is hereby corrected as shown below:

On the Title Page, Item (56) in the References Cited section of US Pat. No. 8,175,452, the following references should be listed: 668,833 2/1901 Gilbert; 4,104,095 8/1987 Shaw; 4,106,967 8/1978 Logan et al.; 4,282,905 8/1981 Dopkin et al.; 4,357,962 11/1982 Shaw et al.; 4,474,573 10/1984 Detty; 6,837,771 1/2005 Falla; 7,191,720 3/2007 Thomas; 7,560,399 7/2009 Rock; 2003/0230120 10/2003 Mitchell et al.; 2005/0075028 4/2005 Rock et al.; 7,752,680 7/2010 Bushman; EP 2,116,143 A2 11/2009 Rock et al.; "Reusable Surgical Medical Fabrics," WL Gore and Associates Inc. et al. 2006.

Signed and Sealed this
Twenty-first Day of October, 2014

Michelle K. Lee
*Deputy Director of the United States Patent and Trademark Office*